United States Patent
Ma et al.

(10) Patent No.: US 12,277,397 B2
(45) Date of Patent: Apr. 15, 2025

(54) METHOD OF TRAINING MODEL, METHOD OF DETERMINING WORD VECTOR, DEVICE, MEDIUM, AND PRODUCT

(71) Applicant: Beijing Baidu Netcom Science Technology Co., Ltd., Beijing (CN)

(72) Inventors: Chao Ma, Beijing (CN); Jingshuai Zhang, Beijing (CN); Qifan Huang, Beijing (CN); Kaichun Yao, Beijing (CN); Peng Wang, Beijing (CN); Hengshu Zhu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 301 days.

(21) Appl. No.: 17/564,369

(22) Filed: Dec. 29, 2021

(65) Prior Publication Data
US 2022/0121826 A1    Apr. 21, 2022

(30) Foreign Application Priority Data

Mar. 15, 2021    (CN) .......................... 202110277972.5

(51) Int. Cl.
*G06F 40/40*    (2020.01)
*G06F 40/30*    (2020.01)
*G06N 7/01*     (2023.01)

(52) U.S. Cl.
CPC .............. *G06F 40/40* (2020.01); *G06F 40/30* (2020.01); *G06N 7/01* (2023.01)

(58) Field of Classification Search
CPC ........ G06F 40/40; G06F 40/30; G06F 40/284; G06F 40/216; G06N 7/01; G06N 3/045; G06N 3/08
See application file for complete search history.

(56) References Cited

U.S. PATENT DOCUMENTS 11,625,534 B1*   4/2023  Agarwal ............. G06V 30/414
                                                        704/9
2004/0117187 A1  6/2004  Keda
(Continued)

FOREIGN PATENT DOCUMENTS

CN    1506937 A    6/2004
CN    101593518 A  12/2009
(Continued)

OTHER PUBLICATIONS

Mikolov et al., Distributed Representations of Words and Phrases and their Compositionality, Oct. 16, arXiv, Cited portions of text (Year: 2013).*

(Continued)

*Primary Examiner* — Hai Phan
*Assistant Examiner* — Ian Scott McLean
(74) *Attorney, Agent, or Firm* — Keating & Bennett, LLP

(57) ABSTRACT

A method of training a model, a method of determining a word vector, a device, a medium, and a product are provided, which may be applied to fields of natural language processing, information processing, etc. The method includes: acquiring a first word vector set corresponding to a first word set; and generating a reduced-dimensional word vector for each word vector in the first word vector set based on a word embedding model, generating, for other word vector in the first word vector set, a first probability distribution in the first word vector set based on the reduced-dimensional word vector, and adjusting a parameter of the word embedding model so as to minimize a difference between the first probability distribution and a second probability distribution for the other word vector determined by a number of word vector in the first word vector set.

16 Claims, 6 Drawing Sheets

(56) References Cited

U.S. PATENT DOCUMENTS

| | | | |
|---|---|---|---|
| 2019/0361978 A1 | 11/2019 | Ray et al. | |
| 2021/0374352 A1 | 12/2021 | Li et al. | |
| 2021/0406464 A1 | 12/2021 | Zhang et al. | |
| 2022/0138534 A1* | 5/2022 | Veyseh | G06F 17/16 |
| | | | 706/15 |
| 2023/0162018 A1* | 5/2023 | Yang | G06N 3/08 |
| | | | 706/25 |

FOREIGN PATENT DOCUMENTS

| | | | | |
|---|---|---|---|---|
| CN | 108829799 A | | 11/2018 | |
| CN | 109308353 A | | 2/2019 | |
| CN | 109635303 A | | 4/2019 | |
| CN | 109933804 A | | 6/2019 | |
| CN | 110598105 A | | 12/2019 | |
| CN | 111737995 A | | 10/2020 | |
| CN | 111767390 A | | 10/2020 | |
| CN | 111783767 A | | 10/2020 | |
| CN | 112069795 A | | 12/2020 | |
| CN | 114662488 A | * | 6/2022 | |
| CN | 109308353 B | * | 8/2023 | G06F 40/284 |

OTHER PUBLICATIONS

Mikolov et al., Distributed Representations of Words and Phrases and their Compositionality, Cited portions of prior art (Year: 2013).*
Official Communication issued in corresponding Chinese Patent Application No. 202110277972.5, mailed on May 12, 2023.

* cited by examiner

METHOD OF TRAINING MODEL, METHOD OF DETERMINING WORD VECTOR, DEVICE, MEDIUM, AND PRODUCT

CROSS-REFERENCE TO RELATED APPLICATION

This application claims the benefit of Chinese Patent Application No. 202110277972.5 filed on Mar. 15, 2021, the whole disclosure of which is incorporated herein by reference.

TECHNICAL FIELD

The present disclosure relates to a computer technology, and in particular to a method of training a model, a method of determining a word vector, an electronic device, a computer-readable storage medium, and a computer program product, which may be applied to a field of natural language processing, a field of information processing, and so on.

BACKGROUND

Word embedding is a technology of representing a word such as a skill word in natural language processing. Conceptually, the word embedding refers to embedding a high-dimensional space of a word whose dimension is the number of all words into a continuous vector space of a word with a much lower dimension, in which each word is mapped to a vector in a real number field. In a plurality of downstream tasks, a word embedding vector may be used as an input, so a quality of the word embedding may greatly affect an effect of the downstream tasks. The downstream task may include, for example, a machine learning task, a resume classification task, a resume evaluation task, a person-job matching task, a bidding task, and so on.

However, an existing technology used for the word embedding has shortcomings in both an efficiency of model training and an effect of model training.

SUMMARY

According to embodiments of the present disclosure, there is provided a method of training a model, a method of determining a word vector, an electronic device, a computer-readable storage medium, and a computer program product.

In an aspect of the present disclosure, there is provided a method of training a model, including: acquiring a first word vector set corresponding to a first word set, the first word set is acquired from a first corpus, and words in the first word set have a non-sequential relationship in linguistics; and for each word vector in the first word vector set, generating a reduced-dimensional word vector based on a word embedding model, generating, for other word vector in the first word vector set, a first probability distribution in the first word vector set based on the reduced-dimensional word vector, and adjusting a parameter of the word embedding model so as to minimize a difference between the first probability distribution generated using an adjusted word embedding model and a second probability distribution for the other word vector determined by a number of word vector in the first word vector set.

In another aspect of the present disclosure, there is provided a method of determining a word vector, including determining a reduced-dimensional word vector for a word vector by using a word embedding model trained by the method according to the first aspect of the present disclosure.

In another aspect of the present disclosure, there is provided an electronic device, including: at least one processor; and a memory communicatively connected to the at least one processor, the memory stores instructions executable by the at least one processor, and the instructions, when executed by the at least one processor, cause the at least one processor to implement the method according to the first aspect of the present disclosure.

In another aspect of the present disclosure, there is provided an electronic device, including: at least one processor; and a memory communicatively connected to the at least one processor, the memory stores instructions executable by the at least one processor, and the instructions, when executed by the at least one processor, cause the at least one processor to implement the method according to the second aspect of the present disclosure.

In another aspect of the present disclosure, there is provided a non-transitory computer-readable storage medium having computer instructions stored thereon, the computer instructions allow a computer to implement the method according to the first aspect of the present disclosure.

In another aspect of the present disclosure, there is provided a non-transitory computer-readable storage medium having computer instructions stored thereon, the computer instructions allow a computer to implement the method according to the second aspect of the present disclosure.

It should be understood that content described in this section is not intended to limit key or important features in the embodiments of the present disclosure, nor is it intended to limit the scope of the present disclosure. Other features of the present disclosure will be easily understood through the following description.

BRIEF DESCRIPTION OF THE DRAWINGS

By describing the exemplary embodiments of the present disclosure in more detail in combination with the drawings, the above and other objectives, features and advantages of the present disclosure will become more obvious. In the exemplary embodiments of the present disclosure, the same reference numerals generally represent the same components. It should be understood that the drawings are used to understand the solution better and do not constitute a limitation to the present disclosure.

In the drawings, the same or corresponding reference numerals represent the same or corresponding components.

DETAILED DESCRIPTION OF EMBODIMENTS

Figure 1:
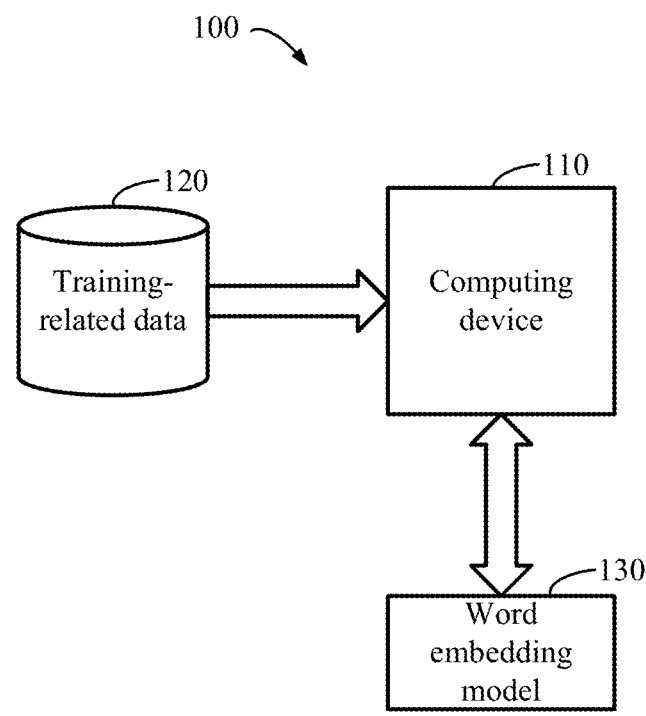
FIG. 1 shows a schematic block diagram of a model training environment 100 in which a method of training a model in some embodiments of the present disclosure may be implemented.

Hereinafter, preferred embodiments of the present disclosure will be described in more detail with reference to the drawings. Although the preferred embodiments of the present disclosure are shown in the drawings, it should be understood that the present disclosure may be implemented in various forms and should not be limited by the embodiments described herein. On the contrary, these embodiments are provided to enable a more thorough understanding of the present disclosure and to fully convey the scope of the present disclosure to those skilled in the art.

The term "including" and its variants as used herein mean an open-ended inclusion, that is, "including but not limited to". Unless otherwise specified, the term "or" means "and/or". The term "based on" means "at least partially based on." The terms "an exemplary embodiment" and "an embodiment" mean "at least one exemplary embodiment". The term "another embodiment" means "at least one other embodiment". The terms "first," "second," and the like may refer to different or the same object. The following may further include other explicit and implicit definitions.

As described above in BACKGROUND, the existing technology used for the word embedding has shortcomings in both the efficiency of model training and the effect of model training.

Specifically, in an existing solution, the word embedding is achieved mainly by using two methods, including Skip-gram and CBOW. In Skip-gram, a sliding window is defined in a corpus, and a window center word is used as an input to predict a context of the word in the window, so that the word embedding is achieved by performing this prediction task. In CBOW, a sliding window is defined in a corpus, and a context of a window center word is used as an input to predict the center word, so that the word embedding is achieved by performing this prediction task.

However, the existing word embedding methods have a plurality of shortcomings. Specifically, a fixed sliding window is not applicable to an embedding scenario of a specific word such as a skill word. This is because that the skill words, different from general words, do not have a sequential relationship in linguistics. The use of the fixed sliding window is not applicable in the skill word embedding scenario. In addition, the existing method is for a single corpus, but skill word embedding vectors in different corpora are not in the same semantic space, and a semantic computation is unavailable. For example, when training on a resume corpus and a job corpus respectively, vectors obtained by training on different corpora are distributed in two different vector spaces, and a distance between vectors may not reflect a semantic correlation. Moreover, in the existing method, a correspondence information between different corpora may not be effectively used to improve an expression ability of the skill word embedding vector. For example, a resume and a job generally have some corresponding relationships, such as a matching of the resume and the job. In a case of training separately, the correspondence information between different corpora is lost, which reduces the expression ability of the vector.

The embodiments of the present disclosure propose a method of embedding a word. A technical solution of this method may be implemented to train a word embedding model for words that do not have a sequential relationship in linguistics, so as to acquire a reduced-dimensional word vector for an input high-dimensional word vector, and may be implemented to simultaneously train for a plurality of corpora by taking into account the association between the plurality of corpora. Furthermore, the technical solution according to the embodiments of the present disclosure may be implemented to, in a case of giving a plurality of corpora, fully use a corpus information and the correspondence information between different corpora for modeling, so as to obtain a skill word embedding vector with a better semantic expression ability.

For example, the technical solution of the embodiments of the present disclosure may be implemented to, in an intelligent recruitment business scenario, obtain a final skill word embedding vector by using a resume information, a job information and a matching information between the resume information and the job information. In the embodiments of the present disclosure, it may be preset that words appearing in a paragraph of description in the job information have a semantic correlation, and words appearing in a paragraph of description in the resume have a semantic correlation. Therefore, if a resume matches a job, the word appearing in the resume description may have a semantic correlation with the word appearing in the corresponding job demand description. According to the above correlation information, a semantic window may be defined, and a prediction task similar to that in Skip-gram may be constructed, and then the skill word embedding vector may be finally obtained. Therefore, a multi-corpus-based skill word embedding method proposed according to the technical solution of the embodiments of the present disclosure may include three steps, including defining a semantic window, constructing positive and negative samples, and achieving a neural-network-based skill word embedding model.

FIG. 1 shows a schematic block diagram of a model training environment 100 in which a method of training a model in some embodiments of the present disclosure may be implemented. According to one or more embodiments of the present disclosure, the model training environment 100 may be a cloud environment. As shown in FIG. 1, the model training environment 100 includes a computing device 110. In the model training environment 100, training-related data 120 including, for example, a word vector set, a word set corresponding to the word vector set, or a corpus that the word set is acquired from, may be provided to the computing device 110 as an input of the computing device 110. The computing device 110 may interact with a word embedding model 130. For example, the computing device 110 may provide at least a portion of the training-related data 120 to the word embedding model 130, receive, from the word embedding model 130, a reduced-dimensional word vector and a probability distribution determined by the word embedding model 130 based on the training-related data 120, and issue an instruction of adjusting a parameters of the word embedding model 130 to the word embedding model 130, by comparing the probability distribution determined by the word embedding model 130 with a corresponding probability distribution that may be used as a basis for comparison, so as to train the word embedding model 130.

According to one or more embodiments of the present disclosure, in the model training environment 100, after receiving the probability distribution determined by the word embedding model 130 based on the training-related data 120, the computing device 110 may issue the instruction of adjusting the parameter of the word embedding model 130 to the word embedding model 130, by comparing the probability distribution determined by the word embedding model 130 with the corresponding probability distribution that may be used as the basis for comparison, so as to minimize a difference between the probability distribution determined by the word embedding model 130 and the corresponding probability distribution that may be used as the basis for comparison.

It should be understood that the model training environment 100 is only exemplary rather than restrictive, and it is extensible. The model training environment 100 may include more computing devices 110 and may provide more training-related data 120 as the input of the computing device 110, and the computing device 110 may interact with more word embedding models 130, so that more users may simultaneously use more computing devices 110 and even use more training-related data 120 to train the word embedding model 130 simultaneously or non-simultaneously. In addition, after training the word embedding model 130, the computing device 110 may further use the word embedding model 130 to determine a reduced-dimensional word vector for a word vector of a skill word, as an example.

In the model training environment 100 shown in FIG. 1, the input of the training-related data 120 to the computing device 110 and the interaction between the computing device 110 and the word embedding model 130 may be performed through a network.

Figure 2:
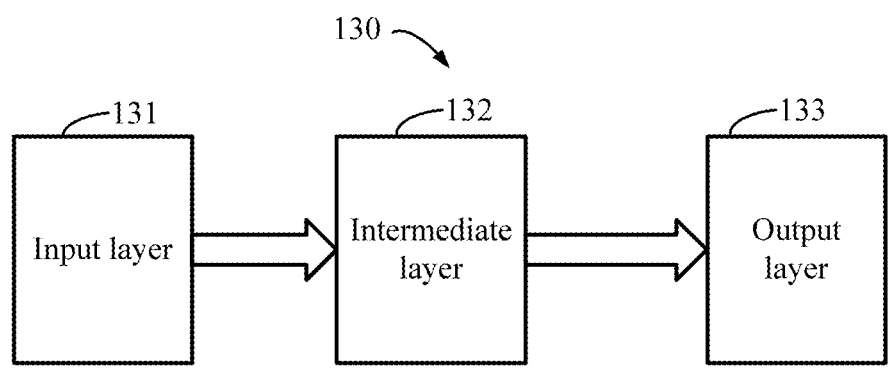
FIG. 2 shows a schematic block diagram of a word embedding model 130 according to some embodiments of the present disclosure.

FIG. 2 shows a schematic block diagram of the word embedding model 130 according to some embodiments of the present disclosure. According to one or more embodiments of the present disclosure, the word embedding model 130 may be of a neural network structure. As shown in FIG. 2, the word embedding model 130 may include an input layer 131, an intermediate layer 132, and an output layer 133. The input layer 131 is used to receive the training-related data 120 that may contain, for example, a word vector set, a word set corresponding to the word vector set, or a corpus that the word set is acquired from. For example, the input layer 131 may be used to receive a training word. It should be understood that the input layer 131 may convert a received word into a corresponding word vector, or the input layer 131 may directly receive the word vector.

The intermediate layer 132 is an intermediate result generated by the word embedding model 130 based on the training-related data 120 received by the input layer 131, which may include, for example, an N-dimensional vector. N is the number of neurons of the intermediate layer 132 as the neural network structure. According to one or more embodiments of the present disclosure, a dimension of the N-dimensional vector contained in the intermediate layer 132 is lower than a dimension of the input word vector, and a value of N may be defined as required. For example, the value of N may be 128, 256, and so on.

A final output of the output layer 133 may be a probability distribution for word vector other than the input word vector in the word vector set generated by the word embedding model 130 based on the intermediate result provided by the intermediate layer 132. According to one or more embodiments of the present disclosure, the probability distribution finally output by the output layer 133 may be provided to the computing device 110 for comparison.

Figure 3:
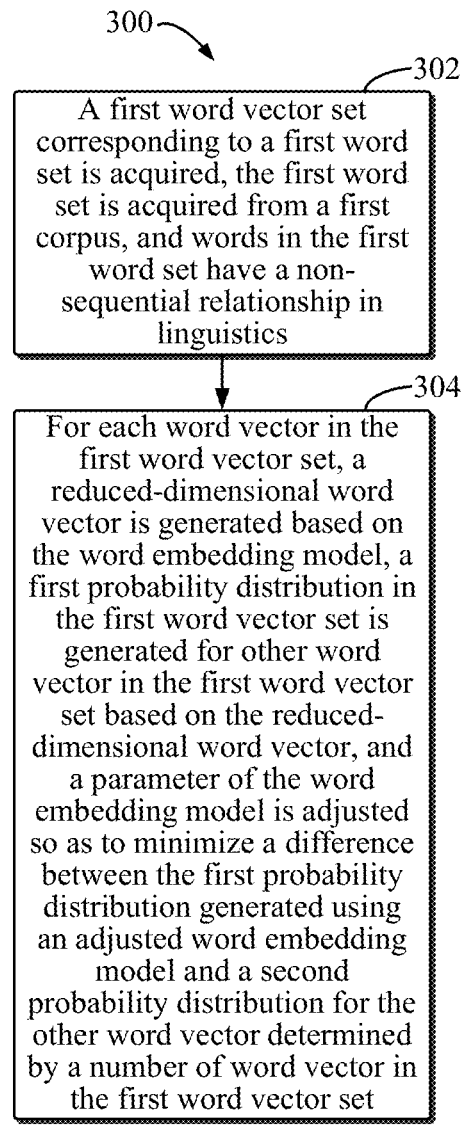
FIG. 3 shows a flowchart of a method 300 of training a model according to some embodiments of the present disclosure.

FIG. 3 shows a flowchart of a method 300 of training a model according to some embodiments of the present disclosure. Specifically, the method 300 of training the model may be performed by the computing device 110 in the model training environment 100 shown in FIG. 1. It should be understood that the method 300 of training the model may further include additional operations and/or operations shown may be omitted, and the scope of the present disclosure is not limited in this respect.

In block 302, the computing device 110 acquires a first word vector set corresponding to a first word set. According to one or more embodiments of the present disclosure, the first word set is acquired from a first corpus, and words in the first word set have a non-sequential relationship in linguistics. For example, the first corpus may be a job information or a resume, and the first word set may be a skill word set in a sentence or a paragraph in the job information or the resume.

According to one or more embodiments of the present disclosure, the word in the first word set belongs to a complete word set, and each word in the complete word set has a corresponding word vector. For example, if the complete word set contains 10000 words, a word vector corresponding to a first word may be a word vector in which a first bit is 1 and the following 9999 bits are 0, a word vector corresponding to a second word may be a word vector in which a second bit is 1 and the first bit and the following 9998 bits are 0, and so on.

In block 304, for each word vector in the first word vector set, the computing device 110 generates a reduced-dimensional word vector based on the word embedding model 130, generates, for other word vector in the first word vector set, a first probability distribution in the first word vector set based on the reduced-dimensional word vector, and adjusts a parameter of the word embedding model 130 so as to minimize a difference between the first probability distribution generated using an adjusted word embedding model 130 and a second probability distribution for the other word vector determined by a number of word vector in the first word vector set.

According to one or more embodiments of the present disclosure, if the first word vector set contains five words in total, in each training of the word embedding model 130, there are four words except a word vector input to the word embedding model 130. In this case, these four words have the same probability in the first word vector set, which is ¼=25%. Therefore, the computing device 110 may adjust the parameter of the word embedding model 130 so that the probability distribution for each of the four word vectors in the first word vector set other than the word vector input to the word embedding model 130 in the first word vector set is as close as possible to 25%.

According to one or more embodiments of the present disclosure, a loss score may be introduced to facilitate a comparison of the first probability distribution and the second probability distribution. For example, the computing device 110 may use a loss function to determine, for the first probability distribution and the second probability distribution, a probability distribution loss score, and then adjust the parameter of the word embedding model 130, so as to minimize the probability distribution loss score determined for the first probability distribution generated using the adjusted word embedding model 130 and the second probability distribution.

According to one or more embodiments of the present disclosure, the computing device 110 may use a gradient descent method to adjust the parameter of the word embedding model 130.

Figure 4:
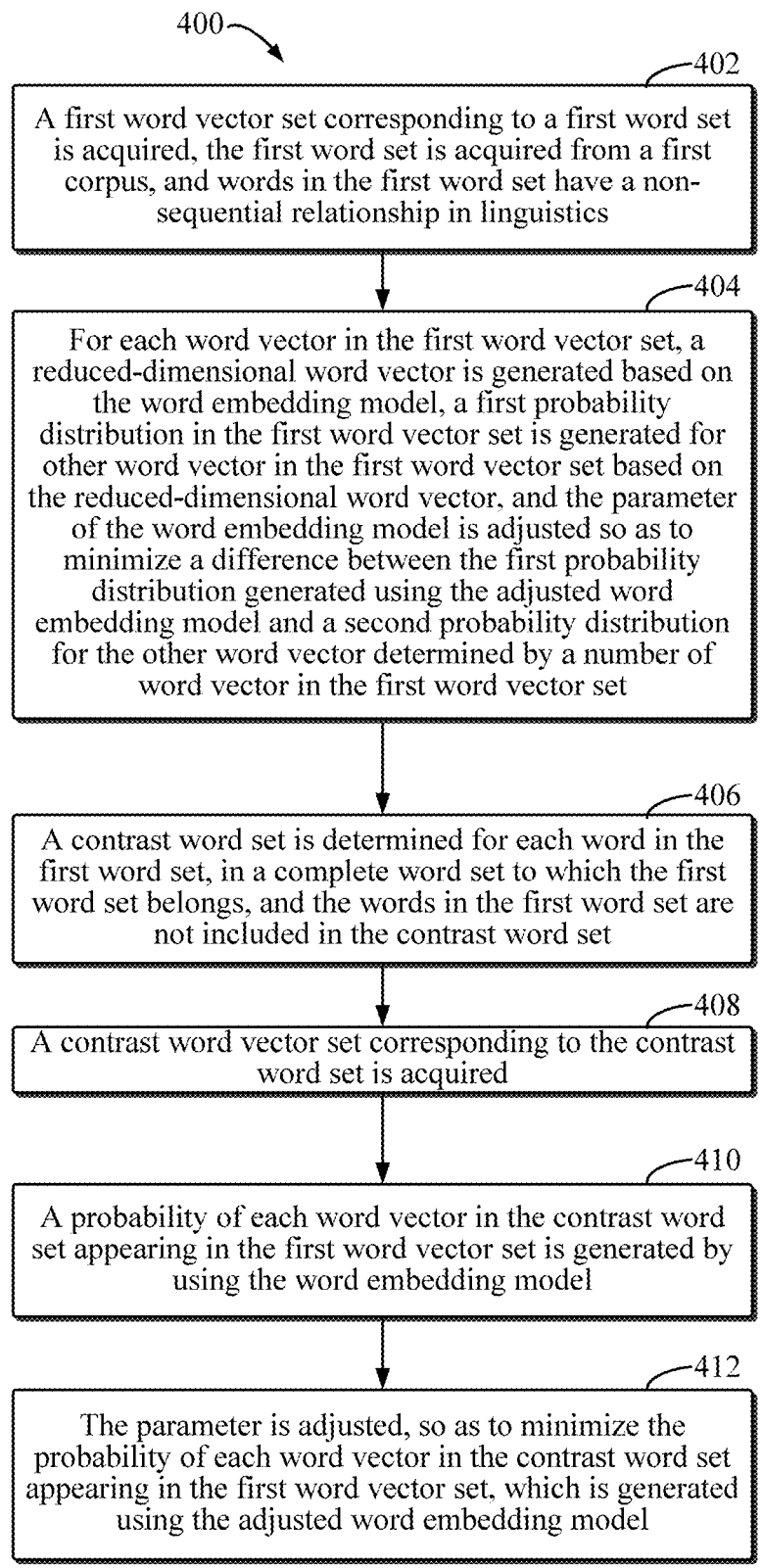
FIG. 4 shows a flowchart of a method 400 of training a model according to some embodiments of the present disclosure.

FIG. 4 shows a flowchart of a method 400 of training a model according to some embodiments of the present disclosure. Specifically, the method 400 of training the model may be performed by the computing device 110 in the model training environment 100 shown in FIG. 1. It should be understood that the method 400 of training the model may further include additional operations and/or operations shown may be omitted, and the scope of the present disclosure is not limited in this respect.

In block 402, the computing device 110 acquires a first word vector set corresponding to a first word set. According to one or more embodiments of the present disclosure, the first word set is acquired from a first corpus, and words in the first word set have a non-sequential relationship in linguistics. A specific content of the step involved in block 402 is the same as that of the step involved in block 302, which will not be repeated here.

In block 404, for each word vector in the first word vector set, the computing device 110 generates a reduced-dimensional word vector based on the word embedding model 130, generates, for other word vector in the first word vector set, a first probability distribution in the first word vector set based on the reduced-dimensional word vector, and adjusts the parameter of the word embedding model 130 so as to minimize a difference between the first probability distribution generated using the adjusted word embedding model 130 and a second probability distribution for the other word vector determined by a number of word vector in the first word vector set. The specific content of the step involved in block 404 is the same as that of the step involved in block 304, which will not be repeated here.

In block 406, the computing device 110 determines, for each word in the first word set, a contrast word set in a complete word set to which the first word set belongs. The words in the first word set are not included in the contrast word set. According to one or more embodiments of the present disclosure, the word in the contrast word set does not belong to the first word set, so the word in the contrast word set may be called a negative sample with respect to the first word set. In contrast, the words in the first word set may be called positive samples with respect to each other.

According to one or more embodiments of the present disclosure, the computing device 110 may determine a sampling probability according to an appearance number of a word appearing in the first corpus and an appearance number of each word in the complete word set appearing in the first corpus, and sample in words in the complete word set other than words in the first word set by using the sampling probability, so as to determine the contrast word set.

In block 408, the computing device 110 acquires a contrast word vector set corresponding to the contrast word set. According to one or more embodiments of the present disclosure, since the contrast word set belongs to the complete word set, each word in the contrast word set has a preset corresponding word vector.

In block 410, the computing device 110 generates, by using the word embedding model 130, a probability of each word vector in the contrast word set appearing in the first word vector set.

In block 412, the computing device 110 adjusts the parameter, so as to minimize the probability of each word vector in the contrast word set appearing in the first word vector set, which is generated using the adjusted word embedding model 130. According to one or more embodiments of the present disclosure, since the word in the contrast word set does not belong to the first word set, the probabilities of these four words appearing in the first word vector set should all be 0. The computing device 110 may adjust the parameter of the word embedding model 130, so that the probability of each word vector in the generated contrast word set appearing in the first word vector set is as close as possible to 0.

According to some embodiments of the present disclosure, a number of word in the contrast word set is in a predetermined ratio to a number of word in the first word set. For example, the number of word in the contrast word set may be 1 time, 2 times, 3 times, 5 times, 7 times, or any preset multiple of the number of word in the first word set.

According to other embodiments of the present disclosure, the contrast word set contain all words in the complete word set except the words in the first word set.

Figure 5:
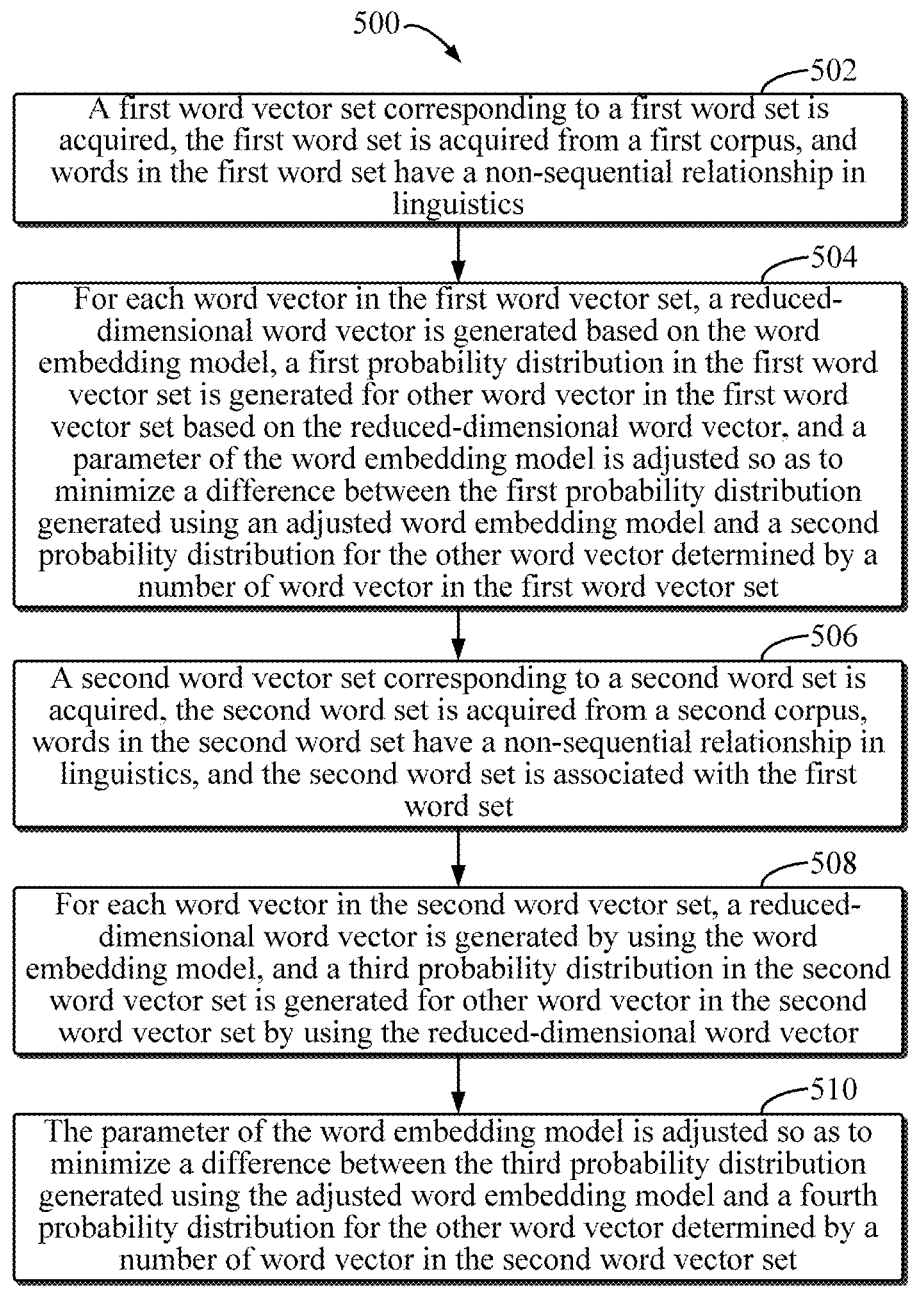
FIG. 5 shows a flowchart of a method 500 of training a model according to some embodiments of the present disclosure.

FIG. 5 shows a flowchart of a method 500 of training a model according to some embodiments of the present disclosure. Specifically, the method 500 of training the model may be performed by the computing device 110 in the model training environment 100 shown in FIG. 1. It should be understood that the method 500 of training the model may further include additional operations and/or operations shown may be omitted, and the scope of the present disclosure is not limited in this respect.

In block 502, the computing device 110 acquires a first word vector set corresponding to a first word set. According to one or more embodiments of the present disclosure, the first word set is acquired from a first corpus, and words in the first word set have a non-sequential relationship in linguistics. A specific content of the step involved in block 502 is the same as that of the step involved in block 302, which will not be repeated here.

In block 504, for each word vector in the first word vector set, the computing device 110 generates a reduced-dimensional word vector based on the word embedding model 130, generates, for other word vector in the first word vector set, a first probability distribution in the first word vector set based on the reduced-dimensional word vector, and adjusts a parameter of the word embedding model 130 so as to minimize a difference between the first probability distribution generated using an adjusted word embedding model 130 and a second probability distribution for the other word vector determined by a number of word vector in the first word vector set. A specific content of the step involved in block 504 is the same as that of the step involved in block 304, which will not be repeated here.

In block 506, the computing device 110 acquires a second word vector set corresponding to a second word set. According to one or more embodiments of the present disclosure, the second word set is acquired from a second corpus, words in the second word set have a non-sequential relationship in linguistics, and the second word set is associated with the first word set. For example, when the first corpus is a job information or a resume, the second corpus may be a job information or a resume corresponding to the first corpus, and the second word set may be a skill word set in a sentence or a paragraph in the job information or the resume.

In block 508, the computing device 110 generates a reduced-dimensional word vector for each word vector in the second word vector set by using the word embedding model 130, and generates, for other word vector in the second word vector set, a third probability distribution in the second word vector set by using the reduced-dimensional word vector. A specific content of the step involved in block 508 is the same as that of a part of the step involved in block 304, which will not be repeated here.

In block 510, the computing device 110 adjusts the parameter of the word embedding model 130 so as to minimize a difference between the third probability distribution generated using the adjusted word embedding model 130 and a fourth probability distribution for the other word vector determined by a number of word vector in the second word vector set. A specific content of the step involved in block 510 is the same as that of a part of the step involved in block 304, which will not be repeated here.

Therefore, the method 500 differs from the method 300 at least in that the second word vector set is introduced, and the word embedding model 130 is trained simultaneously by using the associated first word vector set and second word vector set, so that the word embedding model 130 may be trained more conveniently and efficiently.

Figure 6:
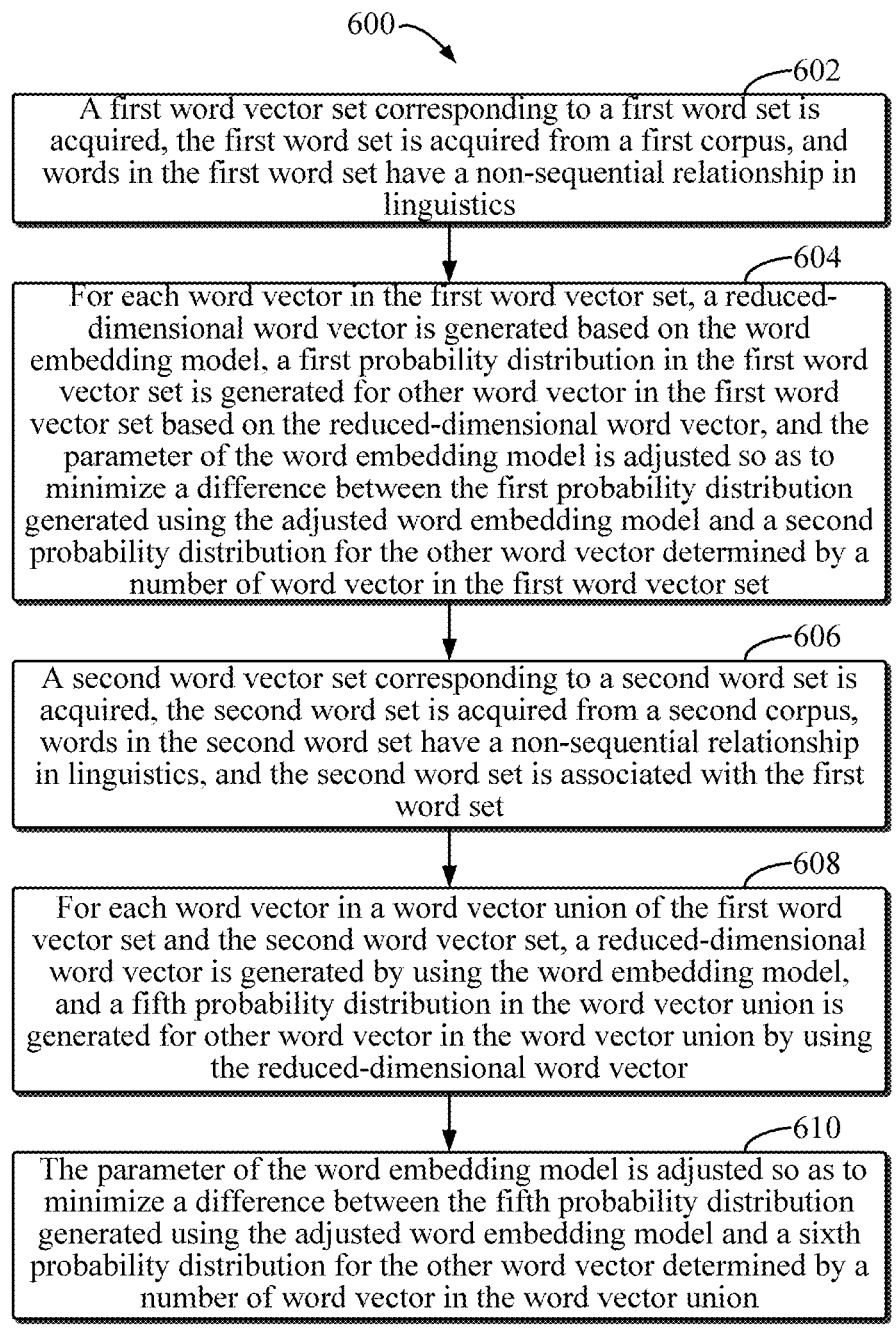
FIG. 6 shows a flowchart of a method 600 of training a model according to some embodiments of the present disclosure.

FIG. 6 shows a flowchart of a method 600 of training a model according to some embodiments of the present disclosure. Specifically, the method 600 of training the model may be performed by the computing device 110 in the model training environment 100 shown in FIG. 1. It should be understood that the method 600 of training the model may further include additional operations and/or operations shown may be omitted, and the scope of the present disclosure is not limited in this respect.

In block 602, the computing device 110 acquires a first word vector set corresponding to a first word set. According to one or more embodiments of the present disclosure, the first word set is acquired from a first corpus, and words in the first word set have a non-sequential relationship in linguistics. A specific content of the step involved in block 602 is the same as that of the step involved in block 302, which will not be repeated here.

In block 604, the computing device 110 generates a reduced-dimensional word vector for each word vector in the first word vector set based on the word embedding model 130, generates, for other word vector in the first word vector set, a first probability distribution in the first word vector set based on the reduced-dimensional word vector, and adjusts the parameter of the word embedding model 130 so as to minimize a difference between the first probability distribution generated using the adjusted word embedding model 130 and a second probability distribution for the other word vector determined by a number of word vector in the first word vector set. A specific content of the step involved in block 604 is the same as that of the step involved in block 304, which will not be repeated here.

In block 606, the computing device 110 acquires a second word vector set corresponding to a second word set. According to one or more embodiments of the present disclosure, the second word set is acquired from a second corpus, words in the second word set have a non-sequential relationship in linguistics, and the second word set is associated with the first word set. A specific content of the step involved in block 606 is the same as that of the step involved in block 506, which will not be repeated here.

In block 608, the computing device 110 generates a reduced-dimensional word vector for each word vector in a word vector union of the first word vector set and the second word vector set by using the word embedding model 130, and generates, for other word vector in the word vector union, a fifth probability distribution in the word vector union by using the reduced-dimensional word vector.

In block 610, the computing device 110 adjusts the parameter of the word embedding model 130 so as to minimize a difference between the fifth probability distribution generated using the adjusted word embedding model 130 and a sixth probability distribution for the other word vector determined by a number of word vector in the word vector union.

Therefore, the method 600 differs from the method 500 at least in that the word embedding model 130 is trained by using the union of the associated first word vector set and second word vector set, rather than separately using the first word vector set and the second word vector set, so that a waste of computing resources caused by training a redundant word vector may be reduced.

An example of training the word embedding model 130 is described below based on the word embedding model 130 shown in FIG. 2 in combination with the method 300, the method 400, the method 500 and the method 600.

Firstly, a word vector $w_i$ of an i-th word in the complete word set containing V words (which may also be referred to as in the first word vector set having a window size of C words) is input into the input layer 131 of the word embedding model 130. This word vector may be represented in a onehot manner.

Then, by multiplying the word vector $w_i$ by a weight matrix of $W_{V \times N}$, a reduced-dimensional word vector with a dimension size N may be obtained in the intermediate layer 132. The intermediate layer 132 may be represented by $h = W_{(i,\cdot)}^T = V_{w_i}^T$.

Then, by multiplying the reduced-dimensional word vector with the dimension size N obtained in the intermediate layer 132 by a weight matrix W', an output vector in the output layer 133 (that is, a V×1 vector u) may be obtained, where $u = W'^T \cdot h$.

An inner product of each element $u_j$ of the vector u (that is, a j-th column of W', represented by $v_{w_j}'$) with the intermediate layer 132$h$ may be calculated to obtain $u_j = v_{w_j}' h$, where $u_j$ represents a possibility of the word j appearing in the semantic window of the word i. In order to facilitate the probability representation, softmax is used to normalize the vector u to between [0,1] as the probability of the output word, which is represented by Equation (1). Finally the output vector y is obtained, where context($w_i$) is the word in the semantic window of $w_i$.

$$P(\text{context}(w_i) = j \mid w_i) = y_j = \text{softmax}(u) = \frac{\exp(u_j)}{\sum_{k \in V} \exp(u_k)} \quad \text{Equation (1)}$$

In addition, the loss function may be defined as Equation (2).

$$E = -\log p(\text{context}(w_i) \mid w_i) = -\log \prod_{c=1}^{C} \frac{\exp(u_{j_c^*})}{\sum_{j=1}^{V} \exp(u_j)} \quad \text{Equation (2)}$$

where $j_c^*$ represents an index of a c-th word in context($w_i$) in the complete word set, and $u_{j_c^*}$ represents an output value of the vector u at a position corresponding to the index. In a case of a negative sampling, the above loss function may be redefined as Equation (3).

$$E = -\log p(\text{context}(w_i) \mid w_i) = -\log \prod_{c=1}^{C} \frac{\exp(u_{j_c^*})}{\sum_{j=1}^{C+NEG} \exp(u_{j^*})} \quad \text{Equation (3)}$$

where C is a size of context($w_i$), and NEG represents the number of negative sample in the negative sampling. The semantic window and the negative sample may be mixed into a training sample, in which j* is the index of the j-th word in the complete word set. Different from the previous loss function, the loss function in a case of adopting a negative sampling strategy only considers the semantic window and the negative sample after sampling, and does not consider the other skill word in the complete word set.

Finally, based on the defined loss function, the model parameters W and W' are continuously updated by using the gradient descent method until the model converges. Then, the trained word embedding model 130 may be used to obtain the reduced-dimensional word vector based on the input word vector, and then a complete set of the reduced-dimensional word vector corresponding to the word vector of the complete word set may be obtained.

The contents related to the model training environment 100 in which the method of training the model in some embodiments of the present disclosure may be implemented, the word embedding model 130 according to the embodiments of the present disclosure, the method 300 of training the model according to the embodiments of the present disclosure, the method 400 of training the model according to the embodiments of the present disclosure, the method 500 of training the model according to the embodiments of the present disclosure and the method 600 of training the model according to the embodiments of the present disclosure are described above with reference to FIG. 1 to FIG. 6. It should be understood that the above description is to better show the contents recorded in the present disclosure and is not intended to limit the present disclosure in any way.

It should be understood that the number of various elements and the size of physical quantities used in the above drawings of the present disclosure are only examples, not restrictions on the scope of protection of the present disclosure. The above number and size may be arbitrarily set as needed without affecting the normal implementation of the embodiments of the present disclosure.

Details of the method 300 of training the model, the method 400 of training the model, the method 500 of training the model and the method 600 of training the model according to the embodiments of the present disclosure are described above with reference to FIG. 1 to FIG. 6. Hereinafter, modules in an apparatus of training a model will be described with reference to FIG. 7.

Figure 7:
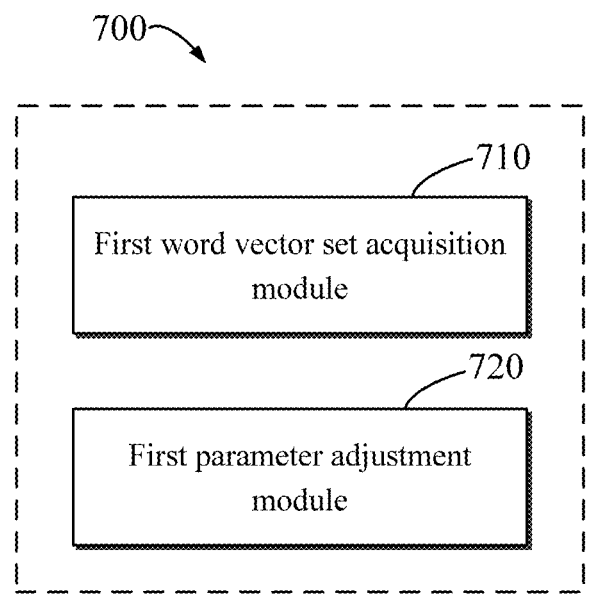
FIG. 7 shows a schematic block diagram of an apparatus 700 of training a model according to some embodiments of the present disclosure.

FIG. 7 shows a schematic block diagram of an apparatus 700 of training a model according to some embodiments of the present disclosure. As shown in FIG. 7, the apparatus 700 of training the model may include: a first word vector set acquisition module 710 configured to acquire a first word vector set corresponding to a first word set, the first word set is acquired from a first corpus, and words in the first word set have a non-sequential relationship in linguistics; and a first parameter adjustment module 720 configured to generate a reduced-dimensional word vector for each word vector in the first word vector set based on the word embedding model, generate, for other word vector in the first word vector set, a first probability distribution in the first word vector set based on the reduced-dimensional word vector, and adjust a parameter of the word embedding model so as to minimize a difference between the first probability distribution generated using an adjusted word embedding model and a second probability distribution for the other word vector determined by a number of word vector in the first word vector set.

In one or more embodiments, the first parameter adjustment module 720 may include: a loss score determination module configured to determine, for the first probability distribution and the second probability distribution, a probability distribution loss score by using a loss function; and a second parameter adjustment module configured to adjust the parameter so as to minimize the probability distribution loss score determined for the first probability distribution generated using the adjusted word embedding model and the second probability distribution.

In one or more embodiments, the apparatus 700 of training the model may further include: a first contrast word set determination module configured to determine, for each word in the first word set, a contrast word set in a complete word set, the first word set belongs to the complete word set, and the words in the first word set are not included in the contrast word set; a contrast word vector set acquisition module configured to acquire a contrast word vector set corresponding to the contrast word set; a probability determination module configured to generate, by using the word embedding model, a probability of each word vector in the contrast word set appearing in the first word vector set; and a third parameter adjustment module configured to adjust the parameter so as to minimize the probability of each word vector in the contrast word set appearing in the first word vector set, which is generated using the adjusted word embedding model.

In one or more embodiments, a number of word in the contrast word set is in a predetermined ratio to a number of word in the first word set.

In one or more embodiments, the contrast word set contains all words in the complete word set except the words in the first word set.

In one or more embodiments, the contrast word set determination module may include: a sampling probability determination module configured to determine a sampling probability according to an appearance number of the word appearing in the first corpus and an appearance number of each word in the complete word set appearing in the first corpus; and a second contrast word set determination module configured to sample in words in the complete word set other than words in the first word set by using the sampling probability, so as to determine the contrast word set.

In one or more embodiments, the apparatus 700 of training the model may further include: a second word vector set acquisition module configured to acquire a second word vector set corresponding to a second word set, the second word set is acquired from a second corpus, words in the second word set have a non-sequential relationship in linguistics, and the second word set is associated with the first word set; a third probability distribution generation module configured to generate a reduced-dimensional word vector for each word vector in the second word vector set by using the word embedding model, and generate, for other word vector in the second word vector set, a third probability distribution in the second word vector set by using the reduced-dimensional word vector; and a fourth parameter adjustment module configured to adjust the parameter of the word embedding model so as to minimize a difference between the third probability distribution generated using the adjusted word embedding model and a fourth probability distribution for the other word vector determined by a number of word vector in the second word vector set.

In one or more embodiments, the apparatus 700 of training the model may further include: a second word vector set acquisition module configured to acquire a second word vector set corresponding to a second word set, the second word set is acquired from a second corpus, words in the second word set have a non-sequential relationship in linguistics, and the second word set is associated with the first word set; a fifth probability distribution generation module configured to generate a reduced-dimensional word vector for each word vector in a word vector union of the first word vector set and the second word vector set by using the word embedding model, and generate, for other word vector in the word vector union, a fifth probability distribution in the word vector union by using the reduced-dimensional word vector; and a fifth parameter adjustment module configured to adjust the parameter of the word embedding model so as to minimize a difference between the fifth probability distribution generated using the adjusted word embedding model and a sixth probability distribution for the other word vector determined by a number of word vector in the word vector union.

In one or more embodiments, the first parameter adjustment module is configured to adjust the parameter by using a gradient descent method.

In one or more embodiments, the word is a skill word.

With the above description with reference to FIG. 1 to FIG. 7, the technical solution according to the embodiments of the present disclosure has a plurality of advantages over the existing solutions. For example, using the technical solution according to the embodiments of the present disclosure, the word embedding model may be trained for words that do not have a sequential relationship in linguistics, so as to obtain a reduced-dimensional word vector for an input high-dimensional word vector, and to simultaneously train for a plurality of corpora by taking into account the association between the plurality of corpora.

The technical solution according to the embodiments of the present disclosure may achieve better semantic computability. Specifically, the technical solution according to the embodiments of the present disclosure may be implemented to construct a semantic window across different corpora by using the correspondence information between the plurality of corpora. On the basis of the constructed semantic window, the positive and negative samples required for training may be constructed using the negative sampling technology, and the final word embedding vector may be obtained by performing the classification task of the positive and negative samples using the neural network. The word embedding vector obtained according to the technical solution of the embodiments of the present disclosure may pull the word embedding vectors from different corpora to approximately the same semantic space, so that the word embedding vectors from different corpora are computable, and a size of a vector dot product may reflect a semantic correlation to a certain extent.

The technical solution according to the embodiments of the present disclosure further has a stronger word embedding vector expression ability. The multi-corpus-based word embedding method according to the technical solution of the embodiments of the present disclosure may be implemented to make full use of the corpus information and the correspondence information between different corpora for modeling, so that the expression ability of the word embedding vector trained by the model may be stronger, and a better performance may be achieved in a key indicator of machine learning and a semantic correlation test case.

The technical solution according to the embodiments of the present disclosure may further make the semantic window definition more reasonable. Different from the fixed sliding window, the technical solution according to the embodiments of the present disclosure may redefine the semantic window unit, which is more suitable for the skill word embedding scenario.

According to the embodiments of the present disclosure, the present disclosure further provides a method of determining a word vector implemented to determine a reduced-dimensional word vector by using the word embedding model trained by the method 300 of training the model, the method 400 of training the model, the method 500 of training the model or the method 600 of training the model, an apparatus of determining a word vector implemented to determine a reduced-dimensional word vector for a word vector by using a word vector determination model trained by the apparatus 600 of training the model of the present disclosure, an electronic device, a computer-readable storage medium, and a computer program product.

In the technical solution of the present disclosure, the collection, storage, use, processing, transmission, provision, and disclosure of the user's personal information involved are in compliance with relevant laws and regulations, and do not violate public order and good customs.

Figure 8:
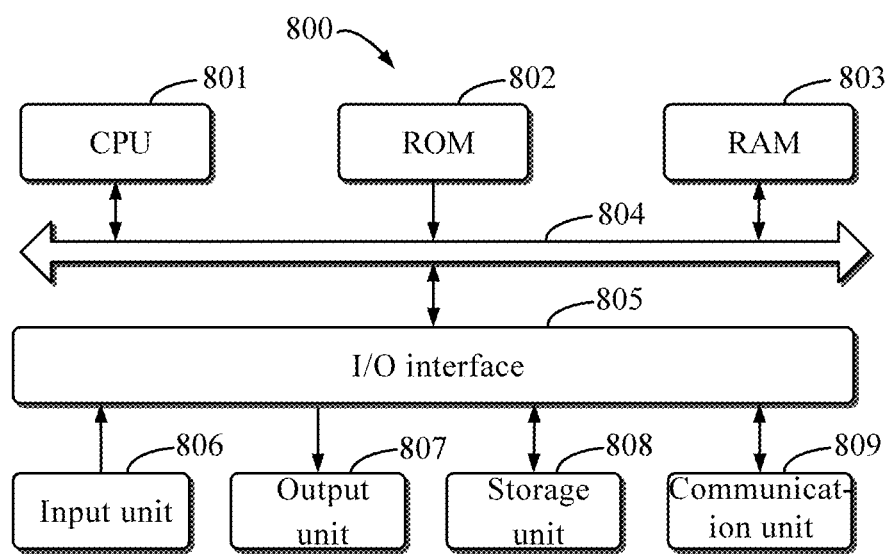
FIG. 8 shows a schematic block diagram of an exemplary electronic device 800 for implementing the embodiments of the present disclosure.

FIG. 8 shows a schematic block diagram of an exemplary electronic device 800 for implementing the embodiments of the present disclosure. For example, the computing device 110 shown in FIG. 1 and the apparatus 700 of training the model shown in FIG. 7 may be implemented by the electronic device 800. The electronic device 800 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 800 includes a computing unit 801, which may perform various appropriate actions and processing based on a computer program stored in a read-only memory (ROM) 802 or a computer program loaded from a storage unit 808 into a random access memory (RAM) 803. Various programs and data required for the operation of the electronic device 800 may be stored in the RAM 803. The computing unit 801, the ROM 802 and the RAM 803 are connected to each other through a bus 804. An input/output (I/O) interface 805 is further connected to the bus 804.

Various components in the electronic device 800, including an input unit 806 such as a keyboard, a mouse, etc., an output unit 807 such as various types of displays, speakers, etc., a storage unit 808 such as a magnetic disk, an optical disk, etc., and a communication unit 809 such as a network card, a modem, a wireless communication transceiver, etc., are connected to the I/O interface 805. The communication unit 809 allows the electronic device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 801 may perform the various methods and processes described above, such as the method 300, the method 400, the method 500 and the method 600. For example, in some embodiments, the method 300, the method 400, the method 500 and the method 600 may be implemented as a computer software program that is tangibly contained on a machine-readable medium, such as the storage unit 808. In some embodiments, part or all of a computer program may be loaded and/or installed on the electronic device 800 via the ROM 802 and/or the communication unit 809. When the computer program is loaded into the RAM 803 and executed by the computing unit 801, one or more steps of the method 300, the method 400, the method 500 and the method 600 described above may be performed. Alternatively, in other embodiments, the computing unit 801 may be configured to perform the method 300, the method 400, the method 500 and the method 600 in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or server.

In the context of the present disclosure, the machine readable medium may be a tangible medium that may contain or store programs for use by or in combination with an instruction execution system, device or apparatus. The machine readable medium may be a machine-readable signal medium or a machine readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a distributed system server, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a model, comprising:
acquiring a first word vector set corresponding to a first word set, wherein the first word set is acquired from a first corpus, and words in the first word set have a non-sequential relationship in linguistics;
for each word vector in the first word vector set,
inputting the word vector to a word embedding model to generate a reduced-dimensional word vector based on the word embedding model, generating, for other word vector in the first word vector set, a first probability distribution in the first word vector set based on the reduced-dimensional word vector, wherein the other word vector is a word vector in the first word vector set except the word vector input to the word embedding model, and adjusting a parameter of the word embedding model so as to minimize a difference between the first probability distribution generated using an adjusted word embedding model and a second probability distribution for the other word vector determined by a number of word vector in the first word vector set, determining, for each word in the first word set, a contrast word set in a complete word set, wherein the first word set belongs to the complete word set, and the words in the first word set are not included in the contrast word set;

acquiring a contrast word vector set corresponding to the contrast word set;

generating, by using the word embedding model, a probability of each word vector in the contrast word set appearing in the first word vector set; and adjusting the parameter so as to minimize the probability of each word vector in the contrast word set appearing in the first word vector set, which is generated using the adjusted word embedding model, wherein the determining of the contrast word set includes:
   determining a sampling probability according to an appearance number of the word appearing in the first corpus and an appearance number of each word in the complete word set appearing in the first corpus; and
   sampling in words in the complete word set other than words in the first word set by using the sampling probability, so as to determine the contrast word set.

2. The method of claim 1, wherein the adjusting a parameter comprises:
   determining, for the first probability distribution and the second probability distribution, a probability distribution loss score by using a loss function; and
   adjusting the parameter so as to minimize the probability distribution loss score determined for the first probability distribution generated using the adjusted word embedding model and the second probability distribution.

3. The method of claim 1, wherein a number of word in the contrast word set is in a predetermined ratio to a number of word in the first word set.

4. The method of claim 1, wherein the contrast word set contains all words in the complete word set except the words in the first word set.

5. The method of claim 1, further comprising:
   acquiring a second word vector set corresponding to a second word set, wherein the second word set is acquired from a second corpus, words in the second word set have the non-sequential relationship in linguistics, and the second word set is associated with the first word set;
   generating a reduced-dimensional word vector for each word vector in the second word vector set by using the word embedding model, and generating, for other word vector in the second word vector set, a third probability distribution in the second word vector set by using the reduced-dimensional word vector; and
   adjusting the parameter of the word embedding model so as to minimize a difference between the third probability distribution generated using the adjusted word embedding model and a fourth probability distribution for the other word vector determined by a number of word vector in the second word vector set.

6. The method of claim 1, further comprising:
   acquiring a second word vector set corresponding to a second word set, wherein the second word set is acquired from a second corpus, words in the second word set have the non-sequential relationship in linguistics, and the second word set is associated with the first word set;
   generating a reduced-dimensional word vector for each word vector in a word vector union of the first word vector set and the second word vector set by using the word embedding model, and generating, for other word vector in the word vector union, a fifth probability distribution in the word vector union by using the reduced-dimensional word vector; and
   adjusting the parameter of the word embedding model so as to minimize a difference between the fifth probability distribution generated using the adjusted word embedding model and a sixth probability distribution for the other word vector determined by a number of word vector in the word vector union.

7. The method of claim 1, wherein the adjusting a parameter comprises adjusting the parameter by using a gradient descent method.

8. The method of claim 1, wherein the word is a skill word.

9. A method of determining a word vector, comprising determining a reduced-dimensional word vector for a word vector by using a word embedding model trained by the method of claim 1.

10. An electronic device, comprising:
   at least one processor; and
   a memory communicatively connected to the at least one processor, wherein the memory stores instructions executable by the at least one processor, and the instructions, when executed by the at least one processor, cause the at least one processor to implement operations of training a model, comprising:
   acquiring a first word vector set corresponding to a first word set, wherein the first word set is acquired from a first corpus, and words in the first word set have a non-sequential relationship in linguistics;
   for each word vector in the first word vector set,
      inputting the word vector to a word embedding model to generate a reduced-dimensional word vector based on the word embedding model,
      generating, for other word vector in the first word vector set, a first probability distribution in the first word vector set based on the reduced-dimensional word vector, wherein the other word vector is a word vector in the first word vector set except the word vector input to the word embedding model, and
      adjusting a parameter of the word embedding model so as to minimize a difference between the first probability distribution generated using an adjusted word embedding model and a second probability distribution for the other word vector determined by a number of word vector in the first word vector set,
   determining, for each word in the first word set, a contrast word set in a complete word set, wherein the first word set belongs to the complete word set, and the words in the first word set are not included in the contrast word set;
   acquiring a contrast word vector set corresponding to the contrast word set;

generating, by using the word embedding model, a probability of each word vector in the contrast word set appearing in the first word vector set; and adjusting the parameter so as to minimize the probability of each word vector in the contrast word set appearing in the first word vector set, which is generated using the adjusted word embedding model, wherein the determining of the contrast word set includes:

determining a sampling probability according to an appearance number of the word appearing in the first corpus and an appearance number of each word in the complete word set appearing in the first corpus; and sampling in words in the complete word set other than words in the first word set by using the sampling probability, so as to determine the contrast word set.

11. The electronic device of claim 10, wherein the instructions, when executed by the at least one processor, further cause the at least one processor to:

determine, for the first probability distribution and the second probability distribution, a probability distribution loss score by using a loss function; and adjust the parameter so as to minimize the probability distribution loss score determined for the first probability distribution generated using the adjusted word embedding model and the second probability distribution.

12. The electronic device of claim 10, wherein a number of word in the contrast word set is in a predetermined ratio to a number of word in the first word set.

13. The electronic device of claim 10, wherein the contrast word set contains all words in the complete word set except the words in the first word set.

14. An electronic device, comprising:

at least one processor; and a memory communicatively connected to the at least one processor, wherein the memory stores instructions executable by the at least one processor, and the instructions, when executed by the at least one processor, cause the at least one processor to implement an operation of determining a word vector, comprising: determining a reduced-dimensional word vector for a word vector by using a word embedding model trained by the electronic device of claim 10.

15. A non-transitory computer-readable storage medium having computer instructions stored thereon, wherein the computer instructions allow a computer to implement operations of training a model, comprising:

acquiring a first word vector set corresponding to a first word set, wherein the first word set is acquired from a first corpus, and words in the first word set have a non-sequential relationship in linguistics;

for each word vector in the first word vector set, inputting the word vector to a word embedding model to generate a reduced-dimensional word vector based on the word embedding model, generating, for other word vector in the first word vector set, a first probability distribution in the first word vector set based on the reduced-dimensional word vector, wherein the other word vector is a word vector in the first word vector set except the word vector input to the word embedding model, and adjusting a parameter of the word embedding model so as to minimize a difference between the first probability distribution generated using an adjusted word embedding model and a second probability distribution for the other word vector determined by a number of word vector in the first word vector set, determining, for each word in the first word set, a contrast word set in a complete word set, wherein the first word set belongs to the complete word set, and the words in the first word set are not included in the contrast word set;

acquiring a contrast word vector set corresponding to the contrast word set;

generating, by using the word embedding model, a probability of each word vector in the contrast word set appearing in the first word vector set; and adjusting the parameter so as to minimize the probability of each word vector in the contrast word set appearing in the first word vector set, which is generated using the adjusted word embedding model, wherein the determining of the contrast word set comprises:

determining a sampling probability according to an appearance number of the word appearing in the first corpus and an appearance number of each word in the complete word set appearing in the first corpus; and sampling in words in the complete word set other than words in the first word set by using the sampling probability, so as to determine the contrast word set.

16. A non-transitory computer-readable storage medium having computer instructions stored thereon, wherein the computer instructions allow a computer to implement an operation of determining a word vector, comprising: determining a reduced-dimensional word vector for a word vector by using a word embedding model trained by the non-transitory computer-readable storage medium of claim 15.

* * * * *